US009781006B2

(12) United States Patent
Stiff

(10) Patent No.: US 9,781,006 B2
(45) Date of Patent: Oct. 3, 2017

(54) GROUP ISOLATION IN WIRELESS NETWORKS

(71) Applicant: Ruckus Wireless, Inc., Sunnyvale, CA (US)

(72) Inventor: David Stiff, Sunnyvale, CA (US)

(73) Assignee: RUCKUS WIRELESS, INC., Sunnyvale, CA (US)

(*) Notice: Subject to any disclaimer, the term of this patent is extended or adjusted under 35 U.S.C. 154(b) by 37 days.

(21) Appl. No.: 14/747,930

(22) Filed: Jun. 23, 2015

(65) Prior Publication Data

US 2015/0372870 A1 Dec. 24, 2015

Related U.S. Application Data

(60) Provisional application No. 62/016,532, filed on Jun. 24, 2014, provisional application No. 62/097,815, filed on Dec. 30, 2014.

(51) Int. Cl.

| | |
|---|---|
| ***H04L 12/24*** | (2006.01) |
| ***H04L 12/46*** | (2006.01) |
| ***H04L 29/06*** | (2006.01) |
| ***H04L 29/08*** | (2006.01) |
| ***H04W 4/08*** | (2009.01) |
| ***H04W 12/02*** | (2009.01) |
| ***H04W 12/04*** | (2009.01) |
| *H04W 88/08* | (2009.01) |
| *H04W 88/12* | (2009.01) |

(52) U.S. Cl.

CPC ...... *H04L 41/0893* (2013.01); *H04L 12/4641* (2013.01); *H04L 63/065* (2013.01); *H04W 4/08* (2013.01); *H04W 12/02* (2013.01); *H04W 12/04* (2013.01); *H04W 88/08* (2013.01); *H04W 88/12* (2013.01)

(58) Field of Classification Search

CPC ....... H04W 4/08; H04W 12/02; H04W 12/04; H04W 88/02; H04W 88/08; H04W 88/12; H04L 12/24; H04L 12/46; H04L 12/4641; H04L 29/06; H04L 29/08; H04L 41/0893; H04L 63/065; H04L 67/2833

See application file for complete search history.

(56) References Cited

U.S. PATENT DOCUMENTS

| | | | | |
|---|---|---|---|---|
| 9,015,299 | B1 * | 4/2015 | Shah | H04L 29/06 370/232 |
| 9,172,678 | B2 * | 10/2015 | Wang | H04L 63/0272 |
| 2005/0050318 | A1 * | 3/2005 | Alone | H04L 63/0428 713/155 |
| 2007/0232265 | A1 * | 10/2007 | Park | H04L 63/104 455/410 |

(Continued)

FOREIGN PATENT DOCUMENTS

WO WO 03093951 A2 * 11/2003 ......... H04L 12/2856

*Primary Examiner* — Tri H Phan

(74) *Attorney, Agent, or Firm* — DLA Piper LLP (US)

(57) ABSTRACT

Methods and systems here may be used for managing a wireless network including associating a first and second wireless access device to an access point (AP), assigning the first and second wireless access device to respective first and second isolation groups, providing local communication via the AP within the isolation group, and prohibiting local communication via the AP between the first and second isolation groups.

25 Claims, 5 Drawing Sheets

(56) References Cited

U.S. PATENT DOCUMENTS

| | | | | |
|---|---|---|---|---|
| 2009/0034431 | A1* | 2/2009 | Nagarajan | H04L 12/4666 370/254 |
| 2011/0030037 | A1* | 2/2011 | Olshansky | H04L 12/4641 726/4 |
| 2011/0167478 | A1* | 7/2011 | Krishnaswamy | H04L 47/10 726/4 |
| 2011/0243081 | A1* | 10/2011 | Liu | H04W 4/08 370/329 |
| 2011/0289193 | A1* | 11/2011 | Kim | H04W 8/005 709/219 |
| 2014/0146735 | A1* | 5/2014 | Poola | H04L 12/2863 370/312 |
| 2014/0344459 | A1* | 11/2014 | Kludy | H04L 41/0893 709/226 |
| 2015/0208431 | A1* | 7/2015 | Chen | H04W 4/08 370/329 |

* cited by examiner

GROUP ISOLATION IN WIRELESS NETWORKS

CROSS REFERENCE

This application relates to and claims priority from U.S. Provisional applications 62/016,532 filed 24 Jun. 2014 and 62/097,815 filed 30 Dec. 2014, both of which are hereby incorporated by reference in their entirety.

TECHNICAL FIELD

This application relates to the field of wireless networking and communications among clients within a network.

BACKGROUND

Current wireless networks cannot isolate groups of client devices efficiently with regards to permissions within a wireless network.

SUMMARY

Disclosed here are exemplary systems and methods for managing a wireless network. Certain example embodiments include methods and systems for managing a wireless network. Certain examples include using a controller in communication with a network and an access point (AP), receiving, from the AP, an indication that a wireless access device is requesting to associate to the AP; upon receiving the indication, associating the wireless access device to the AP; assigning the wireless access device to an isolation group, routing local communication through the AP, among any wireless access devices which are assigned to the same isolation group, and routing communication through the network, among any wireless access devices which are not assigned to the same isolation group.

Certain example embodiments include, additionally or alternatively, methods and systems for managing a wireless network, including via at least one access point (AP) in communication with a network and two wireless access devices, aggregating the two wireless devices into an isolation group, assigning a specific permission set to the isolation group; wherein the at least one AP uses a single service set identification (SSID) and single virtual local area network (VLAN), and allowing communication between the two wireless devices via the at least one AP.

Certain example embodiments include, additionally or alternatively, methods and systems for managing a wireless network, including via a controller in communication with a network and at least one access point (AP), the AP in communication with at least two wireless access devices, aggregating the at least two wireless devices into an isolation group, assigning a specific permission set to the isolation group; wherein the wireless network uses a single service set identification (SSID) and single virtual local area network (VLAN).

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

In certain example wireless networks, various forms of permissions may be used to allow different devices access to different network features. Such permissions may also be tied to billing, accounting, network access, or any number of other capabilities. In certain situations, network administrators may find it useful to isolate different clients in order to prevent one client from accessing other clients directly which may be in communication with the same wireless network. Such isolation may be useful in customizing features for individual devices, as well as customizing permissions for individual devices.

Wireless networks may utilize any number of radios to communicate with any number of client devices. Radios such as WiFi access points (APs), cellular (such as 3G and/or LTE), small cell radios, femtocell radios, and other radios may allow client devices to connect to other client devices as well as to a network such as the internet. As any and all of these radios could be utilized in the descriptions here, the term AP should not be considered limiting, but merely exemplary.

Client devices that are capable of wirelessly communicating on such networks could be any number of things including but not limited to cell phones, smartphones, tablets, laptops, phablets, wearable smart devices, automobiles, or any other device capable of wireless communications. Thus, in this disclosure the term client device or wireless access device should not be considered limiting but should be considered as any kind of wireless device capable of wireless communications.

Figure 1:
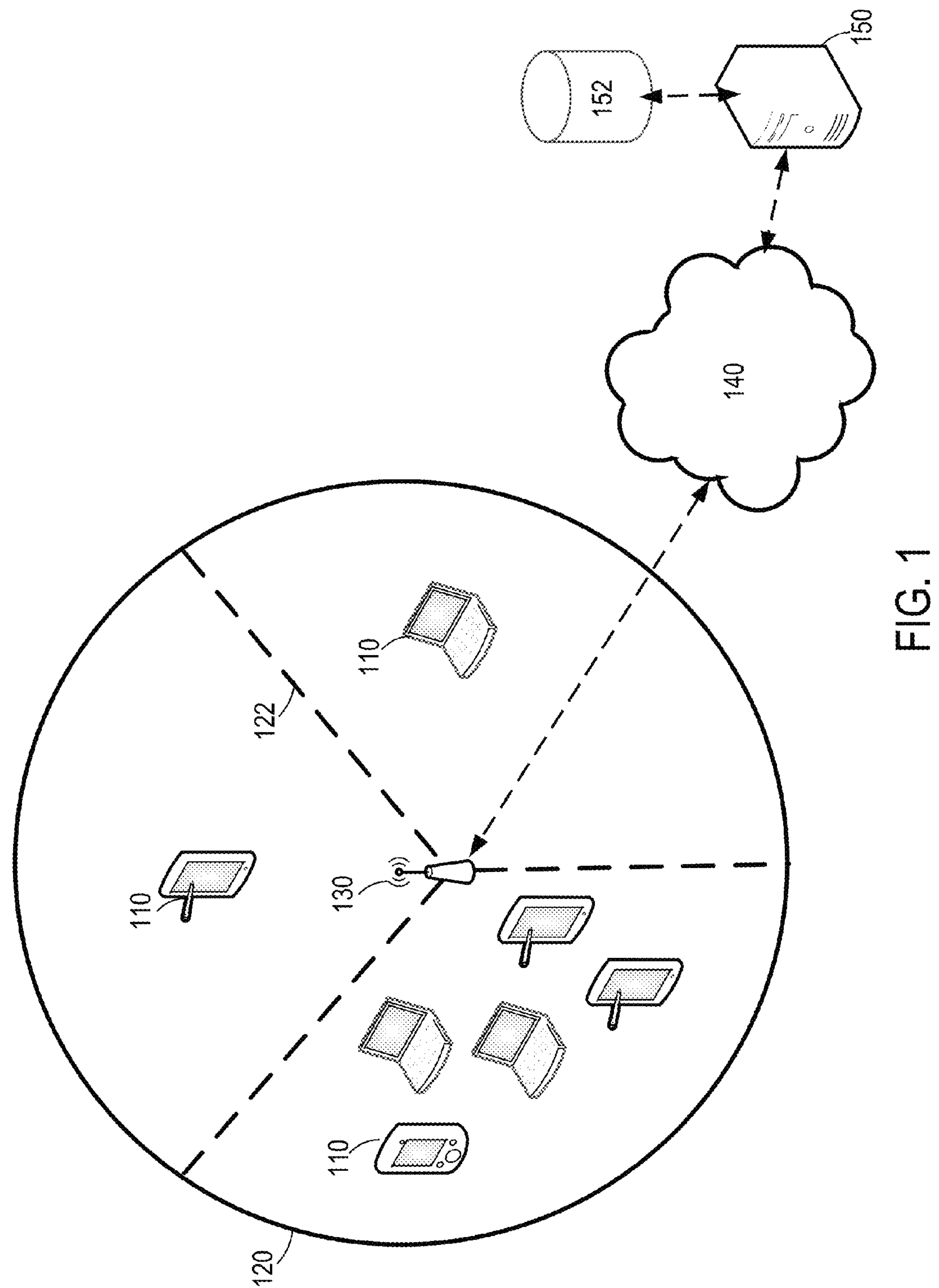
FIG. 1 is a network diagram describing one example system used to implement certain embodiments described here.

FIG. 1 shows an example network, consistent with some inventive aspects disclosed here, arranged with various wireless access devices, or client devices 110 in communication with a single AP 130. FIG. 1 shows a range ring 120 as merely illustrative of the possible range of the AP 130, and the client devices 110 which are shown in range and possible communication with the AP 130, after the client devices have associated to the AP 130.

In this example, the AP 130 is either hard wired into a network 140 or is in communication with the network 140 via a wireless communications route (not shown). Then, the back end of the network includes any number of things, shown for example here by servers 150 including but not limited to authentication, authorization and accounting (AAA) servers, lightweight directory access protocol server LDAP servers, radius servers, active directory servers, open directory, or other functional assets such as controllers, gateways, etc.

It should be noted that these servers could be anywhere as long as they are reachable by the AP 30. They could be on the local network, in a data center, in the cloud, or otherwise reachable by a network. These servers may not be even owned by the same entity, just that they are able to be connected and communicated with.

Anything that can communicate over the network 140 could be included in such a system. The example of a back end system could be the back end of a wireless telecommunications company such as Verizon, AT&T, O2 or any number of other companies. It could be a more localized back end system as well.

Additionally, in the example of FIG. 1, any number of data stores such as databases 152 could be in communication with the servers 150. The data storage 152 is shown in communication with the exemplary server 150 as an example, and could be located anywhere and accessed directly or via the network 140 for example, distributed and even in a networked or cloud storage arrangement. In certain embodiments, the internet is the network 140 depicted.

Continuing with the example of FIG. 1, the wireless network is able to provide data and telephonic access to any number of client devices 110 between and among each other and a network 140. In certain embodiments, different permissions for such client devices 110 may be defined and kept for reference in a centrally housed server such as a AAA server 150. In such an example arrangement, when a client device 110 associates to an AP 130, the AP 130 could then communicate with the AAA server 150 and the database 152 in order to apply the appropriate network/device access, billing and/or other service feature to that specific device.

It should be noted that the example in FIG. 1 showing a single AP is not meant to be limiting but merely illustrative. A network with any number of APs may be used instead of a single AP, which is illustrated for simplicity of the figure and exemplary purposes only.

In the example of FIG. 1, the client devices 110 may or may not be isolated into separate permission groups. Dashed lines 122 are shown as possible isolation groups among client devices, as discussed in more detail below.

Isolated Clients

Figure 2:
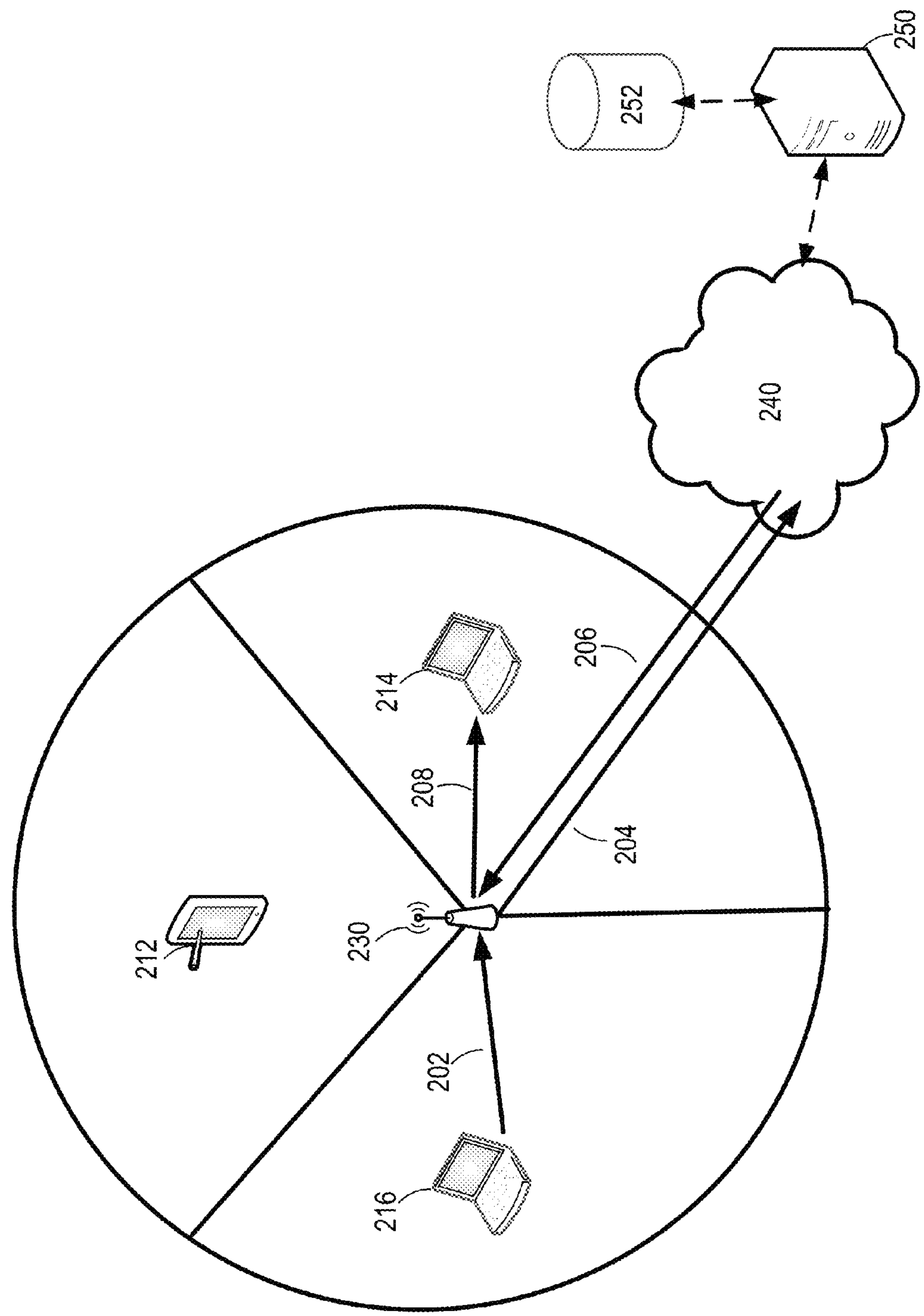
FIG. 2 is a network diagram describing one example system used to implement certain embodiments described here.

Alternatively or additionally, FIG. 2 shows an example embodiment of multiple wireless access devices, or client devices in communication with the AP 230. In this example, the client devices are broken up and isolated by the system by applying different permissions to each client device. In this way, the system is able to handle one client device 212 different than a second client device 214 and even a third client device 216 by recognizing them and applying different access permissions, billing metrics, etc. to each device. The number of isolated client devices could be any number, and in this example three are used, with the intention that it is merely exemplary and not intended to be limiting.

Continuing with the example of FIG. 2, client devices 212, 214 and 216 are all associated with the same AP 230, but isolated such that communication from device 216 to device 214 will not be transmitted directly via the AP 230. Instead, to provide communication traffic between isolated devices on the same network, communication data will be re-routed via network 240. For instance, the device 216 transmits data for device 214 to AP 230 at step 202. The AP 230 receives the data and determines that the clients 216 and 214 are isolated from each other and therefore does not relay the data directly to the device 214. The AP 230 may do nothing further, or may alternatively transmit the device 216 data at step 204 to the network 240. The network 240 receives the data and forwards the data back to the AP 230 at step 206. The AP 230 receives the data from the network 240 and forwards the communication traffic to the device 214. Due to the client isolation within the AP 230, the client devices 212, 214 and 216 are denied permission to transmit data to each other locally via only the AP 230. A proxy, such as network 240, may serve as an intermediary to bypass the client isolation such that the communication is not provided locally by the AP 230. Isolation can provide privacy and security as isolated devices on the same network may be prevented from even seeing which devices are connected to the network. Other levels of permission may be provided between different client devices.

Group Isolation Examples

In certain example embodiments, alternatively or additionally, more than one client device within a client isolation group, connected to a same network, may be allowed by the system to communicate to devices within the same isolation group on the same network. Thus, such an isolated group could still be isolated from other devices that are otherwise connected to the same network, but are not included in the designated group. Such an example lies between a fully open network and a completely isolated network: a network that allows groups of client devices to be open among each other, but isolated from others within the same network. In certain examples this could be used in instances where more than one client device is owned and operated by a single person, or there may be a group of people such as a family, company, or friends, who desire to be grouped together so their separate client devices are given permissions to access each other's devices and communicate among them directly.

Figure 3:
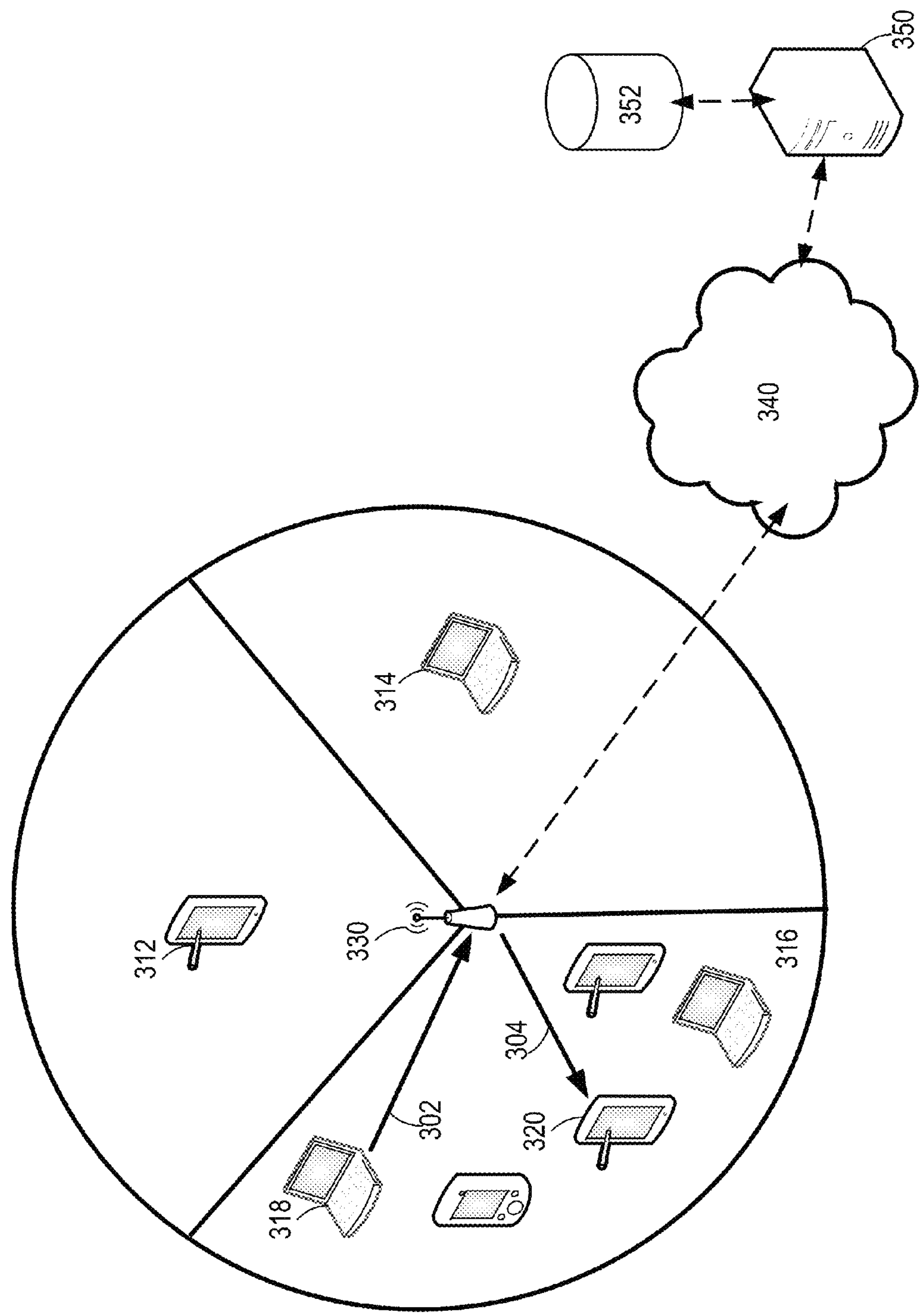
FIG. 3 is a network diagram describing one example system used to implement certain embodiments described here.

Alternatively or additionally, in the example embodiment of FIG. 3, the system has been arranged to allow for more than one wireless access device, or client device 316 to be grouped with other client devices 318, 320 and then isolated from other client devices 312, 314 in the same network of AP 330. The devices within the group of devices 316, 318, 320 are permitted to communicate with each other locally via the AP 330, while communication from these devices to other clients not within the client isolation group, such as devices 312 and 314, are denied by the AP 330. For example, client device 318 transmits data for device 320 within the same group to AP 330 at step 302. The AP 330 receives and analyzes the data, determines that the client device 318 is within the same client isolation group as the client device 320, and grants permission to forward the data to the client device 320 at step 304. If, however, the data is intended for the device 312 or device 314, the AP 330 would deny the client device 318 from locally forwarding the data by the AP 330. In such an example embodiment, a client device 318 may communicate with a second client device 320 in a designated grouping 316 through the AP 330 without the AP 330 having to communicate with the back end network 340 and server 350.

It should be noted that the examples stating that a single AP allows for local communication is not intended to be limiting. For example, if one controller manages multiple APs locally, then the local communication may be between and among locally operated APs all in communication with the same controller. In such an example, the AP 330 in FIG. 3 may be more than one AP, but still route communications without going back through the network 340.

More examples of group isolation may include where a family checks into a hotel covered by a network within the grounds of the property. One member of the family may have both a smartphone and a tablet computer while the other members of the family each have their own respective smartphones. In the hotel, by grouping all of the family members' client devices into one isolation group, the system may allow them access to each other's devices, grant permission to share billing amongst the group, grant permission to access particular network addresses amongst the group, allow the members of the group to share data plans or billing rates, or any number of other permissions and accesses.

Certain aspects may include other elements. For example, communication is allowed between the devices in one client isolation group but prohibited from other devices not in the same client isolation group. Group security may be used to protect the group from inadvertently sharing data outside the group and preventing eavesdropping and snooping attacks.

In such a way, one family member at the pool can video call another member in their hotel room locally via the same network, while being isolated from local communication from other families, hotel guests, hotel employees, etc. The family members can share the data plan assigned to their group, and receive a consolidated bill for the group's data usage. Some embodiments could be utilized in enterprise levels such as offices or hospitals for certain groups of employees to share information and permissions.

Thus, the example embodiment of FIG. 3 allows for a certain number of client devices to be grouped in this way, given permissions to interact directly via the AP 330, where the APs also do not have to check with any back end to do so. Other devices within the network that are outside of the client isolation group are provided a different set of permissions than those devices within the group.

It should be noted that in some embodiments, a controller may be utilized as part of the network which identifies client device group members. In such an embodiment, accessing information on the controller is not considered accessing information to a AAA server and/or other back end server(s). This is because a controller may be maintained and operated by the local network administrator. A controller may also be locally connected, and function as the coordinator for local APs, separate and apart from any service provider or data provider company.

Figure 4:
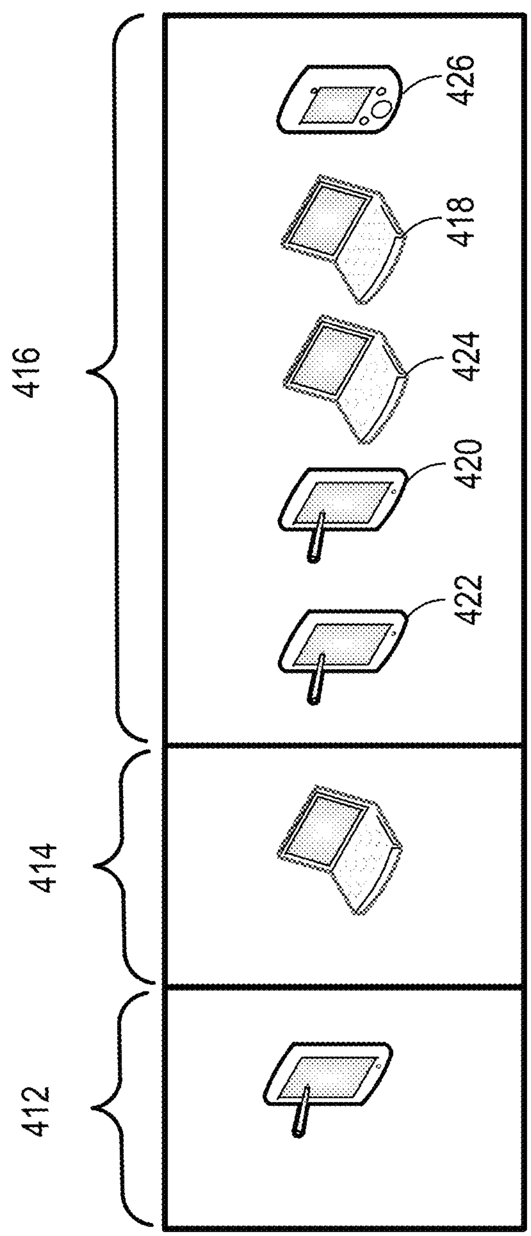
FIG. 4 is a diagram depicting one example of group isolation used to implement certain embodiments described here.

FIG. 4 shows an alternative or additional example of the grouping of client devices. In the example of FIG. 4, there are three groups isolated from one another, group one 412, group two 414 and group three 416. Inside each grouping, in keeping with the previous examples, are wireless access devices, or client devices such as client device 418 and device 420 in the group three 416 along with other devices 422, 424 and 426. The other example groups 412 and 414 are shown in the example with just one device each, but they too could contain any number of devices and groupings as well. Likewise, the example embodiment shows three groupings, whereas any number of groupings could be established in the network. Each group is provided a different set of network permissions such that the groups are isolated from each other in some manner. The example of three groupings is exemplary and not intended to be limiting. In the example, the back end (not pictured), for example the AAA server for the service provider company that the client device users subscribe to, can utilize these groupings in order to bill, authenticate, authorize and assign permissions, among other things.

There may be many possible ways to localize the permissions and access of client devices on a network. Some example ways to set up such isolation groups may be to set up many or separate service set identifiers (SSIDs). Another way may be to set up separate virtual local area networks (VLANs). But another way to establish such groups may be through different network administration.

Figure 5:
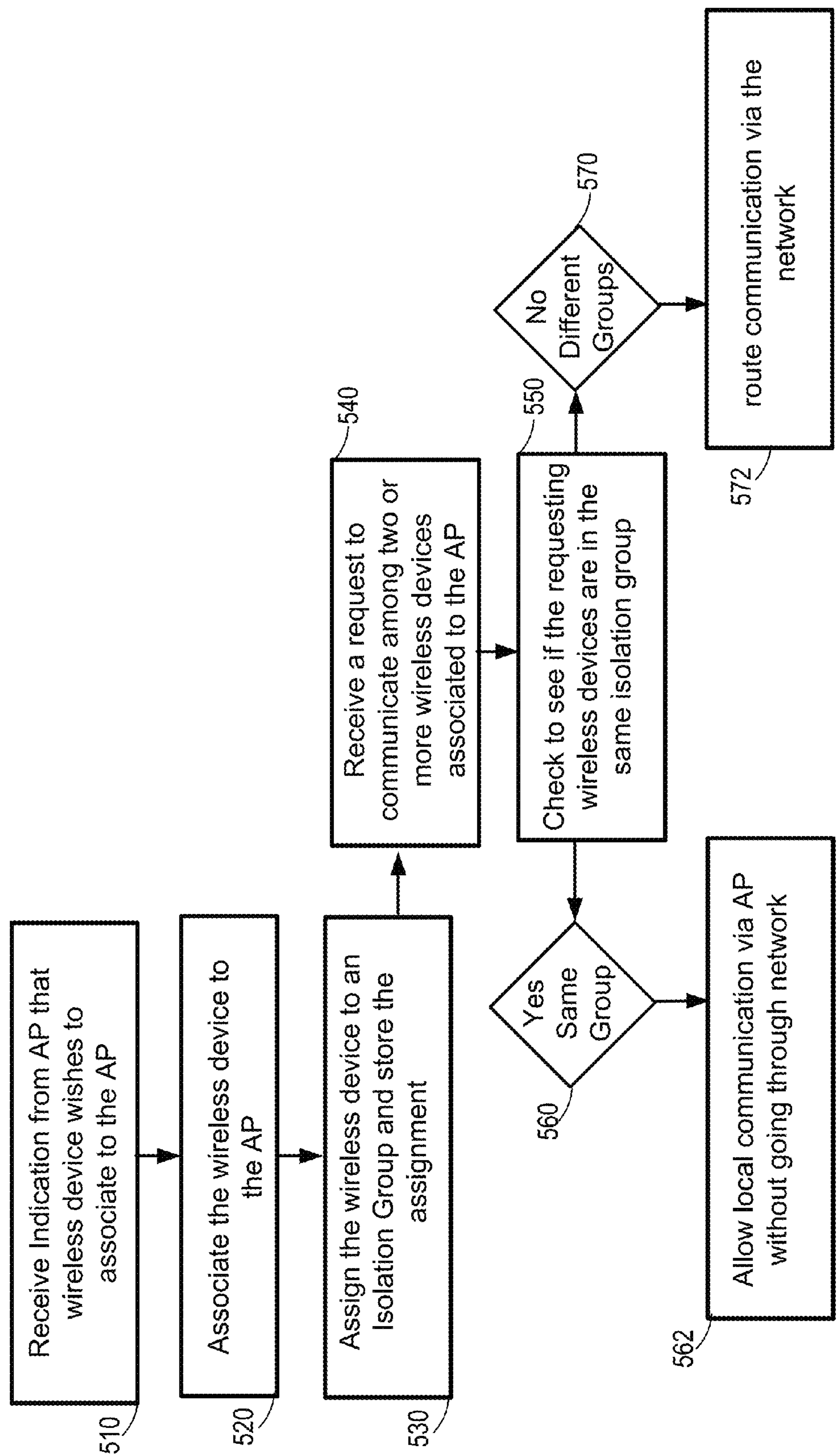
FIG. 5 is a flow chart depicting an example decision tree for group isolation used to implement certain embodiments described here.

FIG. 5 shows an example flow chart of certain alternative or additional embodiments described here. The flow chart depicts an example decision tree from the perspective of a controller in communication with an AP and a network, but could be from the perspective of an AP if the AP is so configured in an example network. In the flow chart example, the controller first receives an indication from the AP that a wireless device wishes to associate to the AP 510. Next, the controller allows the wireless device to associate to the AP 520. The controller then assigns the wireless device to an isolation group and stores that information in a local or network based storage 530. Although not pictured, any number of wireless devices could be associated to an AP and assigned to any number of isolation groups. As described below, any of various pieces of data could be used to identify the wireless devices to the various groups. Additionally, the way the controller assigns the wireless devices to the isolation groups could be through any of various ways described below.

When the controller receives a request for different wireless devices, which are associated with the AP to communicate 540 is checks the stored assignment data to see if the requesting wireless devices are in the same isolation group 550. If the wireless devices are assigned to the same isolation group 560, the controller allows the wireless devices to communicate locally, that is, through the AP directly, without having to go through the network 562. If, on the other hand, the requesting associated wireless devices are not in the same isolation group, and therefore in different groups 570, the controller routes their communications through the network 572 and does not allow local communication via the AP only.

Access Control List

In certain embodiments, alternatively or additionally, APs and/or controllers may retain access control lists (ACLs) of client devices for group isolation purposes. In such example embodiments, the list may contain lists of network layer information or Media Access Control (MAC) Layer 2 information. In such a way, the network may be arranged so that only one SSID is used, and isolation groups may still be configured. Further, in such a configuration, there is no need to arrange for multiple VLANs in establishing the isolation groups.

There may be various ways for the ACLs to be established and maintained. The individual wireless devices could request to be included in a certain isolation group upon association or at a later time. Additionally or alternatively, a system administrator could assign wireless devices to isolation groups depending on services that the user has paid for. For example, the owner of a hotel which administers its own APs, allows a family of users who check into the hotel to all communicate via the local APs because they paid to upgrade their wireless package upon check-in.

Some example ways to set up such ACLs of isolation groups may be to utilize pre-shared keys with the devices in the same group, utilizing dynamic pre-shared keys with the devices in the same group, utilizing lists of MAC addresses identifying client devices in different groups, utilizing lists of usernames and password credentials in different groups so when they sign onto a system their input of the credentials indicates their isolation group.

Such storage of list information may occur in any number of places. For example, in certain embodiments, the lists may be stored in the APs themselves. In certain embodiments, the lists may be stored in a controller. In certain embodiments, the lists may be stored in a remote storage, accessible by an AP and/or controller. If the AP is able to access the list, or be informed by the controller or other AP, the permissions may be locally stored and utilized.

Pre-Shared Key Examples

In certain embodiments, alternatively or additionally, pre-shared keys may be used to identify groups of client devices. In such examples, when a client device associates to the AP, the AP presents the client device a captive portal. Through this portal the user through the client device is able to enter its already known pre-shared key for the network they wish to join. Then each device that wishes to join that particular network with the pre-shared key may do so. The system then identifies that particular pre-shared key with a particular isolation group that each client device with the key may be allowed to join.

Dynamic Pre-Shared Key Examples

In certain embodiments, alternatively or additionally, dynamic pre-shared keys may be used to identify groups of client devices. In such examples, when a client device associates to the AP, the AP presents the client device a captive portal. Through this portal the user through the client device is able to enter a dynamic pre-shared key for the network they wish to join. Then each device that wishes to join that particular network with the dynamic pre-shared key may do so. The system then identifies that particular dynamic pre-shared key with a particular isolation group that each client device with the key may be allowed to join.

Dynamic pre-shared keys may allow the system to create a unique encryption key for each user client device upon accessing the wireless network for the first time. Such an encryption key could be any number of bytes, or N bytes such as but not limited to, 63-bytes. It also automatically configures the client devices with the requisite wireless settings, for example but not limited to SSID and unique passphrase, all without any manual intervention by a system administrator, etc.

Lists of MAC Address Examples

In certain embodiments, alternatively or additionally, lists of client device MAC addresses may be used to identify groups of client devices. In such example embodiments, the system can store MAC addresses and associate those MAC addresses with different groupings of client devices. Thus, when a client device associates to an AP that has access to such information, the client device MAC address is communicated to the AP. This MAC address can be compared to a list of MAC addresses that indicate a particular isolation group that the client device belongs to.

Lists of Usernames and Password Credential Examples

In certain embodiments, alternatively or additionally, lists of username and password credentials may be used to identify groups of client devices. In such example embodiments, the system can store username and password credentials and associate those credentials with different groupings of client devices. Thus, when a client device associates to an AP that has access to such information, the client device is presented with a login portal which asks for a username and password. These credentials may be compared to a list of credentials that indicate a particular isolation group that the client device belongs to.

In certain embodiments, alternatively or additionally, the usage of username and password credentials adds flexibility to the system. In such a system, there is no need for the AP or controller to maintain a list of MAC addresses of client devices, which could be loaded before the client devices are able to utilize the system. Instead, in an embodiment using username and password credentials, groups may be created at any time, say for example, when the example family checks into the hotel. A single username and password combination may be issued to the family for group isolation purposes. In some examples, the individual uses their individual client devices with some other previously assigned username and password credential but the system is able to associate that credential to a particular group.

Third Party Website Credentials

In certain embodiments, alternatively or additionally, third party website credentials may be used to identify groups of client devices. In such an example embodiment, a client device could log into a third party website, and through that third party website, the credentials for a group could be checked. In one example, a client device associates to an AP and is presented with a social networking site login page. When the user, through the client device, logs into the social networking page, the system gains access to a friend list that the client profile includes. In such a way, all of the friends of the user are included on the user's isolation group when they are associated to APs in the wireless network.

Other third party website credentials may be used as well, for example, including but not limited to contacts, friends, more distant relations such as friends-of-friends, etc. Example social networks may include Facebook, LinkedIn, Google+, etc. In such a way, existing social networks could be leveraged in the isolation group setting to create isolation groups of client devices and their users.

Hardware to Identify Groups

In certain embodiments, alternatively or additionally, the hardware that maintains any exemplar lists or groupings for credentials to join a particular group may be a controller. Such a device may be in communication directly with APs or in communication with them via a network. In certain embodiments, the hardware that maintains any exemplar lists or groupings for credentials to join a particular group may be the APs themselves. In such an example, the APs need not consult or communicate with a controller or server in order to allow a client device with the appropriate credentials access to a particular group. Instead, all of the relevant information may be distributed to the APs, for example in a distributed hash table, and stored on the AP or APs themselves, and are locally accessed when different client devices associate to the AP.

In either case, the network administrator may provide the credential lists to the controller or APs or both in order to facilitate setting up the groups of client devices.

Conclusion

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for managing a wireless network, comprising:

via a controller in communication with a network and an access point (AP), receiving, from the AP, an indication that a wireless access device is requesting to associate to the AP;

upon receiving the indication, associating the wireless access device to the AP;

assigning the wireless access device to an isolation group;

routing local communication through the AP locally, for any wireless access devices which are assigned to the same isolation group; and routing communication through the AP and then the network, for any wireless access devices which are not assigned to the same isolation group.

2. The method of claim 1 wherein the wireless access device is assigned to the isolation group using an access control list.

3. The method of claim 2 wherein the access control list uses at least one of a single service set identification (SSID) and a single virtual local area network (VLAN).

4. The method of claim 2 wherein the access control list uses at least one of a pre-shared key and a dynamic pre-shared key.

5. The method of claim 2 wherein the access control list uses media access control (MAC) information of the wireless access devices.

6. The method of claim 5 wherein the access control list uses MAC addresses of the wireless access devices.

7. The method of claim 2 wherein the access control list uses username and password credentials.

8. The method of claim 2 wherein the access control list uses third-party website credentials.

9. The method of claim 2 wherein the access control list is created at the controller and sent to the AP.

10. The method of claim 1 further comprising:

assigning a different permission set of wireless network features of the AP to each isolation group.

11. A non-transitory computer-readable medium having computer-executable instructions thereon for a method for managing a wireless network, the method comprising:

via at least one access point (AP) in communication with a network and two wireless access devices, aggregating the two wireless devices into an isolation group;

assigning a specific permission set to the isolation group;

wherein the at least one AP uses a single service set identification (SSID) and single virtual local area network (VLAN); and allowing direct, local communication between the two wireless devices in the same isolation group via the at least one AP locally; and routing communication through the network, among any wireless devices which are not assigned to the same isolation group.

12. The non-transitory computer-readable medium of claim 11 wherein the isolation group shares a dynamic pre-shared key.

13. The non-transitory computer-readable medium of claim 11 wherein the isolation group is identified in an identifier list stored in a lightweight directory access protocol server (LDAP).

14. The non-transitory computer-readable medium of claim 13 wherein the isolation group identifier includes a group name and password.

15. The non-transitory computer-readable medium of claim 11 further comprising an isolation group identifier that is a list of media access control (MAC) addresses.

16. The non-transitory computer-readable medium of claim 11 further comprising an isolation group identifier that is obtained via a third party website.

17. The non-transitory computer-readable medium of claim 16 wherein the third party website is a social network website.

18. The non-transitory computer-readable medium of claim 11 further comprising a controller in communication with the at least one access point.

19. The non-transitory computer-readable medium of claim 11 further comprising an authentication, authorization and accounting (AAA) server in communication with the network, wherein the isolation group is defined at the AAA server.

20. The non-transitory computer-readable medium of claim 11 further comprising a radius server, in communication with the network, wherein the isolation group is defined at the radius server.

21. The non-transitory computer-readable medium of claim 11 wherein the specific permission set determines accessibility to the network for the devices within the isolation group.

22. The non-transitory computer-readable medium of claim 11 wherein the specific permission set determines billing features of the isolation group.

23. The non-transitory computer-readable medium of claim 11 further comprising, via the at least one access point, aggregating a third and fourth wireless device in a second isolation group;

assigning a different specific permission set to the second isolation group;

allowing communication between the third and fourth wireless devices via the at least one AP.

24. The non-transitory computer-readable medium of claim 23 further comprising, routing through the network communication between wireless devices in different isolation groups.

25. A system for managing a wireless network, comprising:

a controller in communication with a network and at least one access point (AP), the AP in communication with at least two wireless access devices, the controller configured to, aggregate the at least two wireless devices into an isolation group;

assign a specific permission set to the isolation group;

route local communication locally through the AP, among wireless access devices which are assigned to the same isolation group; and route communication through the network, among wireless access devices which are not assigned to the same isolation group, wherein the wireless network uses a single service set identification (SSID) and single virtual local area network (VLAN).

* * * * *